United States Patent Office 3,211,764
Patented Oct. 12, 1965

3,211,764
19-NORANDROSTADIENES AND METHOD OF PREPARING THE SAME
John Johnston Brown, Pearl River, and Seymour Bernstein, New City, N.Y., assignors to American Cyanamid Company, Stamford, Conn., a corporation of Maine
No Drawing. Filed Sept. 25, 1963, Ser. No. 311,303
4 Claims. (Cl. 260—397.45)

This invention relates to new steroid compounds. More particularly, it relates to new 11β-hydroxy-19-norandrosta-4,9(10)-dien-3-ones.

The novel steroid of the present invention may be illustrated by the formula:

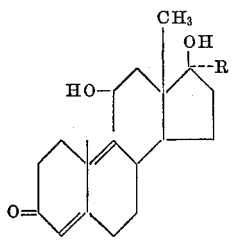

wherein R is selected from the group consisting of hydrogen, lower alkyl, ethynyl and chloroethynyl.

The compounds of this invention are, in general, white crystalline solids, relatively insoluble in water, but soluble in many common organic solvents such as lower alkanols and esters, acetone, dioxane and the like.

The present compounds are preferably prepared by a two-step synthesis comprising the steps: (1) subjecting a Δ5(10),9(11)-3-one steroid of the formula:

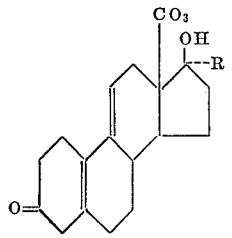

wherein R is as defined above, in solution in a basic solvent such as pyridine, quinoline, or the like, to the oxidative action of air, oxygen or other oxygen source to form an intermediate hydroperoxide of the formula:

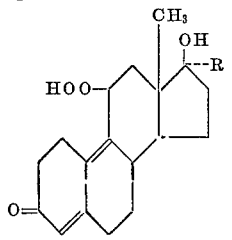

wherein R is as defined above; followed by (2) treating said intermediate hydroperoxide with a reducing agent such as, for example, an alkali metal iodide to yield the desired product.

Usually it is not necessary to isolate or purify the intermediate hydroperoxide. In general, the crude intermediate may be treated with an alkali metal iodide reducing agent, sodium iodide being a convenient reducing agent in a solvent, such as acetic acid and a lower alkanol. The final product can then be isolated by conventional techniques and purified by crystallization. In the oxidation step this may be accomplished by stirring the solution of starting material exposed to air at room temperature for two or three days.

The compounds of the present invention are useful as hypocholesteremic agents in the treatment of hypercholesteremia and related vascular disorders.

The following examples illustrate in greater detail the preparation of the 17-substituted 11β-hydroxy-19-norandrosta-4,9(10)-dien-3-ones.

*Example 1.—Preparation of 11β,17β-dihydroxy-19-norandrosta-4,9(10)-dien-3-one*

17β-hydroxy-19-norandrosta-4,9(10)-dien-3-one is prepared by the method described in J. Am. Chem. Soc. 82, 2402 (1960). p-Toluenesulfonic acid (100 mg.) is added to a solution of 17β-hydroxy-19-norandrosta-4,9(10)-dien-3-one (200 mg.) in methanol (4 ml.), methylene chloride (4 ml.) and methyl orthoformate (4 ml.). After 10 minutes pyridine (2 ml.) is added followed by methylene chloride. The mixture is washed with water and dried and the gum obtained by removal of solvent is dissolved in petroleum ether and chromatographed on a synthetic magnesium silicate (10 g.). The gum eluted with 1% acetone in petroleum ether is dissolved in acetone (6 ml.) and dilute sulfuric acid (3 drops; 8% v./v.) is added. After 5 minutes the solution is diluted with water and the mixture is kept in the cold for one hour. The material which has separated is collected, dried and crystallized from acetone-petroleum ether to give 17β-hydroxy-19-norandrosta-5(10),9(11)-dien-3-one as needles (90 mg.), melting point about 100–118° C.

A solution of 17β-hydroxy-19-norandrosta-5(10),9(11)-dien-3-one (500 mg.) in pyridine (12.5 ml.) is stirred at room temperature for about three days. Solvent is removed to give crude 11β-hydroperoxy-17β-hydroxy-19-norandrosta-4,9(10)-dien-3-one. Sodium iodide (1 g.) is added to a solution of this hydroperoxide in methanol (20 ml.) and acetic acid (10 ml.) and the mixture is kept at room temperature for thirty minutes. Aqueous sodium thiosulfate is added followed by water and the mixture is extracted with methylene chloride. The dried extract is chromatographed on a synthetic magnesium silicate (25 g.) and the material eluted with 25% acetone in methylene chloride is crystallized from acetone-n-hexane to give the above product (180 mg.), melting point 184°–188° C.

*Example 2.—Preparation of 11β,17β-dihydroxy-17α-methyl-19-norandrosta-4,9(10)-dien-3-one*

17β-hydroxy - 17α - methyl - 19 - norandrosta-4,9(10)-dien-3-one [J. Am. Chem. Soc., 82, 2402 (1960)] is treated as in Example 1 above to give the product 17β-hydroxy-17α-methyl-19-norandrosta-5(10),9(11)-dien-3-one.

A solution of 17β-hydroxy-17α-methyl-19-norandrosta-5(10),9(11)-dien-3-one (500 mg.) in pyridine (12.5 ml.) is stirred at room temperature for three days. Solvent is removed to give crude 11β-hydroperoxy-17β-hydroxy-17α-methyl - 19 - norandrosta - 4,9(10)-dien-3-one which is treated with sodium iodide (1 g.) in methanol (20 ml.) and acetic acid (10 ml.) as described in Example 1. The product, isolated by chromatography as in Example 1 above, is crystallized from acetone-n-hexane. The product (200 mg.) has a melting point of 189°–193° C.

*Example 3.—Preparation of 11β,17β-dihydroxy-17α-chloroethynyl-19-norandrosta-4,9(10)-dien-3-one*

17α-chloroethynyl - 17β - hydroxy-19-norandrosta - 4,9 (10)-dien-3-one [J. Am. Chem. Soc., 83, 4663 (1961)] is treated as in Example 1 above to give the product 17α-chloroethynyl - 17β-hydroxy-19-norandrosta-5(10),9(11)-dien-3-one.

The latter steriod on stirring at room temperature in pyridine produces the corresponding 11β-hydroperoxy derivative which, on treatment with sodium iodide as described in Example 1, produces 11β,17β-dihydroxy-17α-chloroethynyl-19-norandrosta-4,9(10)-dien-3-one.

*Example 4.—Preparation of 11β,17β-dihydroxy-17α-ethynyl-19-norandrosta-4,9(10)-dien-3-one*

Following the procedure of Example 1 and using as starting material 17α-ethynyl-17β-hydroxy-19-norandrosta-5(10),9(11)-dien-3-one the product described above is obtained.

We claim:
1. The compound 11β,17β-dihydroxy-17α-chloroethynyl-19-norandrosta-4,9(10)-dien-3-one.
2. A method of preparing compounds of the formula:

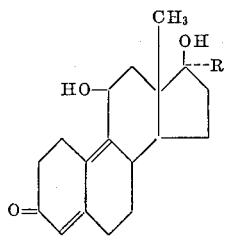

wherein R is selected from the group consisting of hydrogen, lower alkyl, ethynyl and chloroethynyl which comprises contacting the corresponding 19-norandrosta-5(10),9(11)-diene with oxygen to produce 11β-hydroperoxido - 19 - norandrosta - 4,9(10)-diene, subsequently treating the said 11β-hydroperoxido compound with an alkali metal iodide and recovering said compound therefrom.

3. A method of preparing 11β,17β-dihydroxy-19-norandrosta-4,9(10)-dien-3-one which comprises contacting 17β-hydroxy-19-norandrosta-5(10),9(11)-dien-3-one with oxygen in the presence of pyridine, subsequently treating the reaction product, 11β-hydroperoxido-17β-hydroxy-19-norandrosta-4,9(10)-diene-3-one with sodium iodide in a solvent and recovering said compound therefrom.

4. A method of preparing 11β,17β-dihydroxy-17α-methyl-19-norandrosta-4,9(10)-dien-3-one which comprises contacting 17β-hydroxy-17α-methyl-19-norandrosta-5(10),9(11)-dien-3-one with oxygen in the presence of pyridine, subsequently treating the reaction product, 11β-hydroperoxido - 17β-hydroxy-17α-methyl-19-norandrosta-4,9(10)-diene-3-one with sodium iodide in a solvent and recovering said compound therefrom.

References Cited by the Examiner

UNITED STATES PATENTS 3,085,098 4/63 Nomine et al. _____ 260—397.4
3,086,027 4/63 Perelman _____ 260—397.3

LEWIS GOTTS, *Primary Examiner.*

UNITED STATES PATENT OFFICE
CERTIFICATE OF CORRECTION

Patent No. 3,211,764            October 12, 1965

John Johnston Brown et al.

It is hereby certified that error appears in the above numbered patent requiring correction and that the said Letters Patent should read as corrected below.

Column 1, lines 35 to 43, the formula should appear as shown below instead of as in the patent:

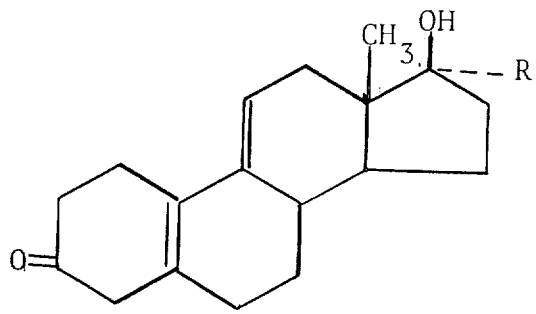

Signed and sealed this 24th day of May 1966.

(SEAL)
Attest:

ERNEST W. SWIDER
Attesting Officer

EDWARD J. BRENNER
                                        Commissioner of Patent